United States Patent [19]
Jewitt

[11] 3,944,865
[45] Mar. 16, 1976

[54] HOMOPOLAR DYNAMO-ELECTRIC MACHINES

[75] Inventor: Cyril Jewitt, Newcastle-upon-Tyne, England

[73] Assignee: Reyrolle Parsons Limited, Hebburn, England

[22] Filed: May 23, 1974

[21] Appl. No.: 473,057

[30] Foreign Application Priority Data
May 25, 1973  United Kingdom............ 25221/73

[52] U.S. Cl................................ 310/178; 310/114
[51] Int. Cl.² .................................. H02K 31/00
[58] Field of Search .......... 310/178, 113, 219, 248, 310/67, 242, 266, 224, 10, 40, 52, 114, 232, 219, 137, 147; 321/28; 322/48; 318/253

[56] References Cited
UNITED STATES PATENTS

| | | | |
|---|---|---|---|
| 2,979,630 | 4/1961 | Bishop | 310/178 |
| 3,163,792 | 12/1964 | Sayers | 310/178 |
| 3,242,418 | 3/1966 | Mela | 310/52 |
| 3,368,087 | 2/1968 | Madsen | 310/52 |
| 3,443,134 | 5/1969 | Dowsett | 310/178 |
| 3,539,852 | 11/1970 | Appleton | 310/178 |
| 3,579,005 | 5/1971 | Noble | 310/178 |
| 3,586,894 | 6/1971 | Mueller | 310/178 |
| 3,670,187 | 6/1972 | Thum | 310/10 |
| 3,742,265 | 6/1973 | Smith | 310/52 |
| 3,764,835 | 10/1973 | Luck | 310/10 |

Primary Examiner—R. Skudy
Attorney, Agent, or Firm—Henry M. Bissell

[57] ABSTRACT

A homopolar dynamo-electric machine with stationary superconducting field coils has contra-rotating rotors carrying conductors which are interconnected by slip-rings and brushes between the rotors to form a series circuit with the current flowing through the conductors of one rotor in the opposite direction to the flow in the conductors of the other rotor.

8 Claims, 5 Drawing Figures

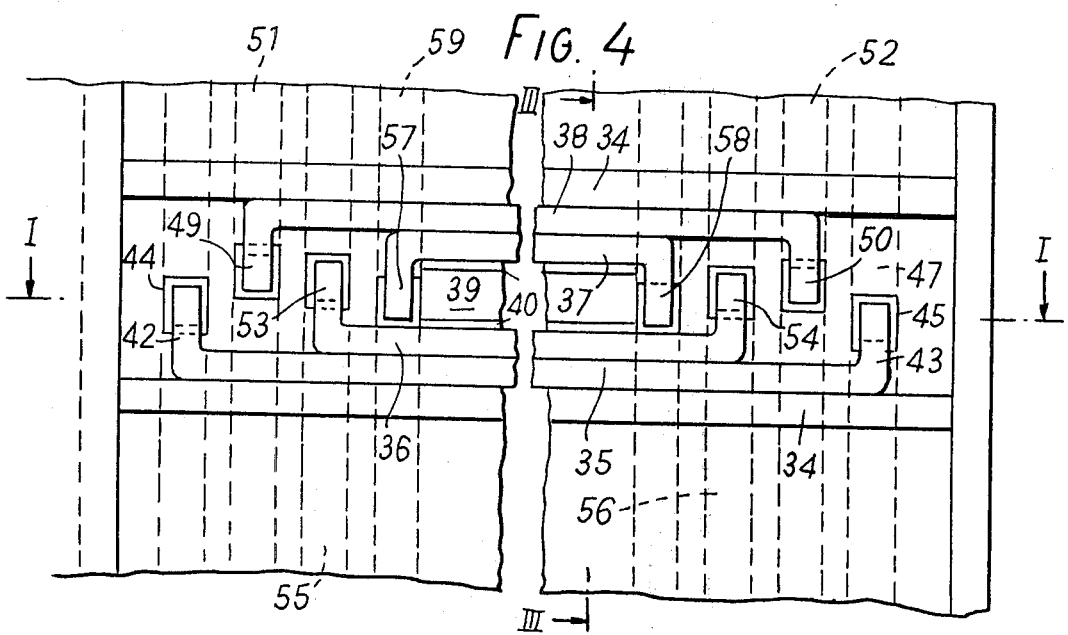
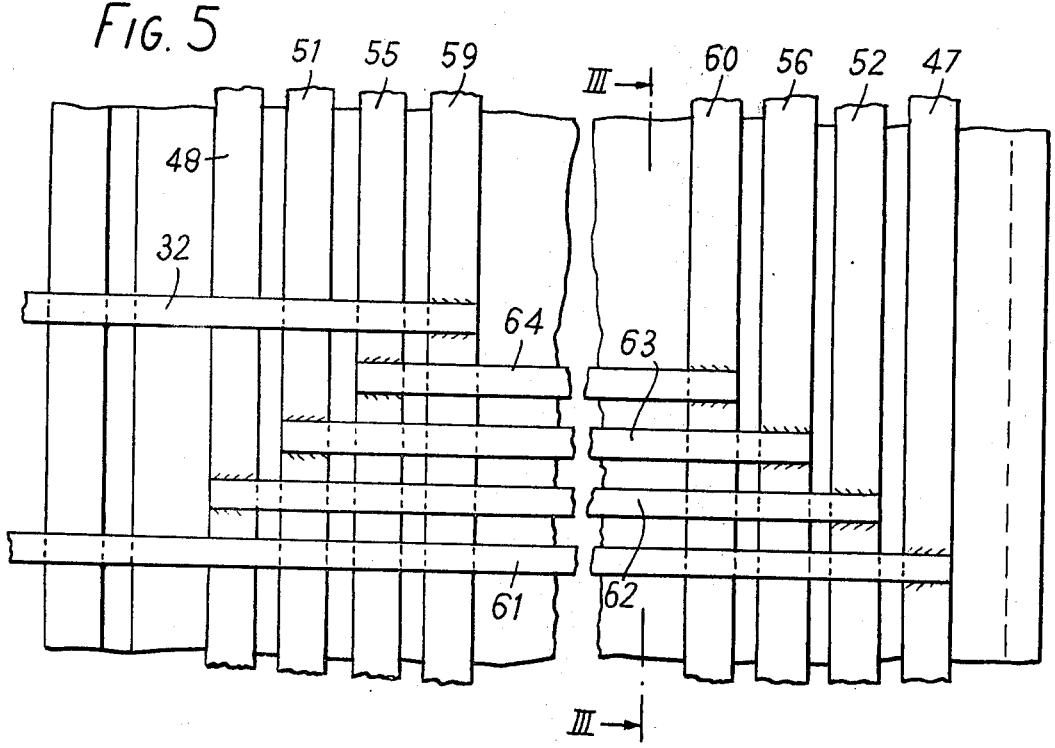

HOMOPOLAR DYNAMO-ELECTRIC MACHINES

The present invention relates to homopolar dynamo-electric machines.

Low rotor voltage is a feature common to both disc and drum types of homopolar machines and machines have been proposed in which multiple rotors or segmented rotors have been adopted to increase rotor voltage. The advent of superconducting coils capable of producing high magnetic fields has also contributed to the possibility of designing practical homopolar machines with useful rotor voltages for large scale drive and generation purposes.

The present invention is concerned with a homopolar machine which enables increased rotor voltages to be obtained whilst permitting a reduction in the number of stationary conductors carrying the rotor current which are required, as compared with previous proposals. A further object of the invention is to provide a machine having a contra-rotating shaft output.

According to the present invention a homopolar dynamoelectric machine is provided having at least one stator field winding and two co-axially arranged contra-rotating rotors each carrying one or more conducting paths for electric current positioned to cut the magnetic field produced by the stator field winding or windings upon rotation of the rotors, there being further provided current transfer elements at at least one end of the conducting paths arranged to convey current directly from a first conducting path on one of the rotors carrying current flow towards a first current transfer element at one end of the said first path to a second conducting path on the other rotor carrying current flow away from a second current transfer element at one end of the said second path, the said first and second current transfer elements being in immediate current transfer relationship with one another.

In the preferred machine a drum rotor arrangement comprises two concentric drum rotors each carrying a plurality of axially-disposed rotor conductor bars and the ends of the bars terminating in continuous slip-rings or current transfer brushes whereby groups of the bars on one rotor are connected in series with groups of the bars on the other rotor. Similar connection arrangements are also possible on disc-type machines.

In alternative forms of the invention, segmented slip-rings may be used to effect series connection of rotor bars as described in our U.S. Pat. No. 3,497,739. The invention may also be applied to the simpler forms of machine, however, using continuous drum or disc-Shaped conductors for the rotors. In any form of the invention using a drum type of machine the rotor may be of conical as opposed to cylindrical shape.

Two superconducting field windings are used in the preferred drum-rotor form of the machine, but the invention is not restricted to the use of superconducting field windings or to this number of field windings for drum or disc-rotor applications.

Drive from the rotors is preferably by way of co-axial contra-rotating shafts making the motor form of the machine particularly attractive for marine propulsion. For machines according to the the invention employed as generators, a separate prime mover at each end of the machine for each rotor would generally be preferred. In their use either as motors or generators, the two rotors may be coupled to give a single rotor drive by means of, for example, gearing.

The invention will now be described in more detail with the aid of an example illustrated in the accompanying drawings, in which.

Figure 1:
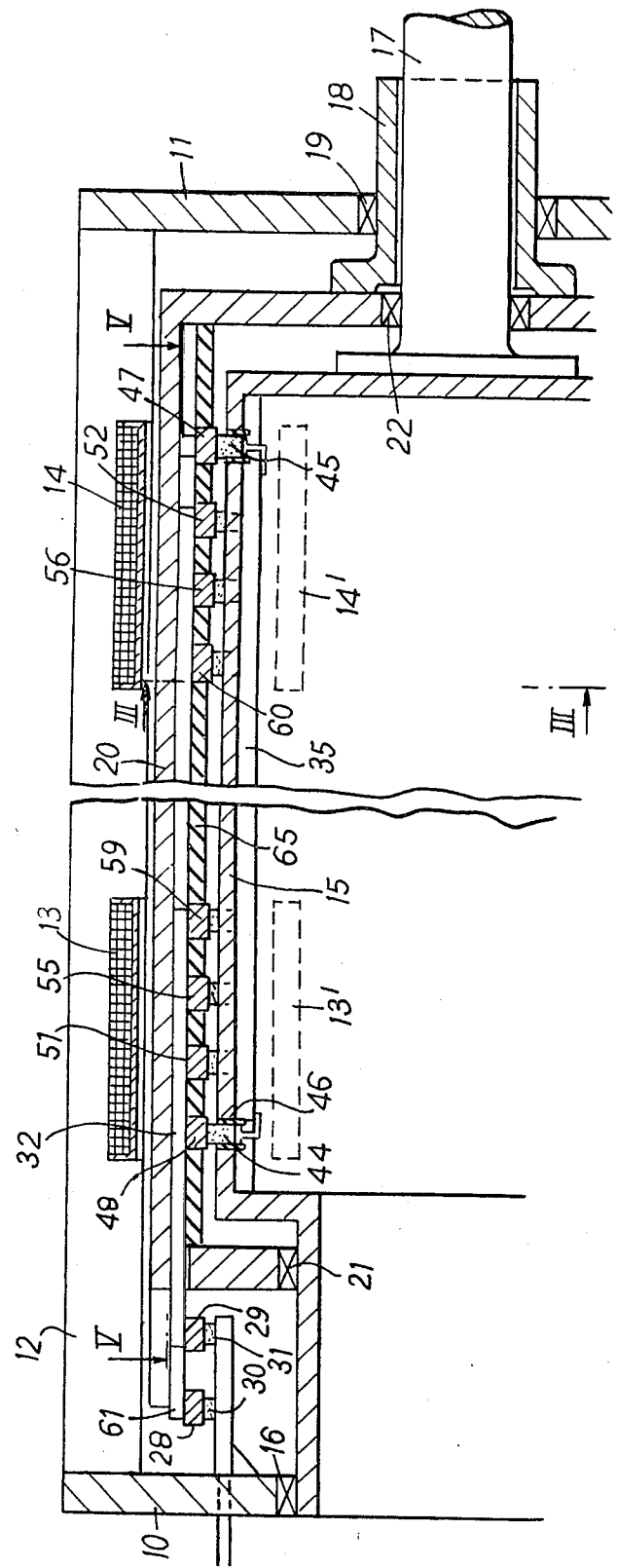
FIG. 1 is a partial longitudinal section of a homopolar dynamo-electric machine in accordance with the invention.
Figure 3:
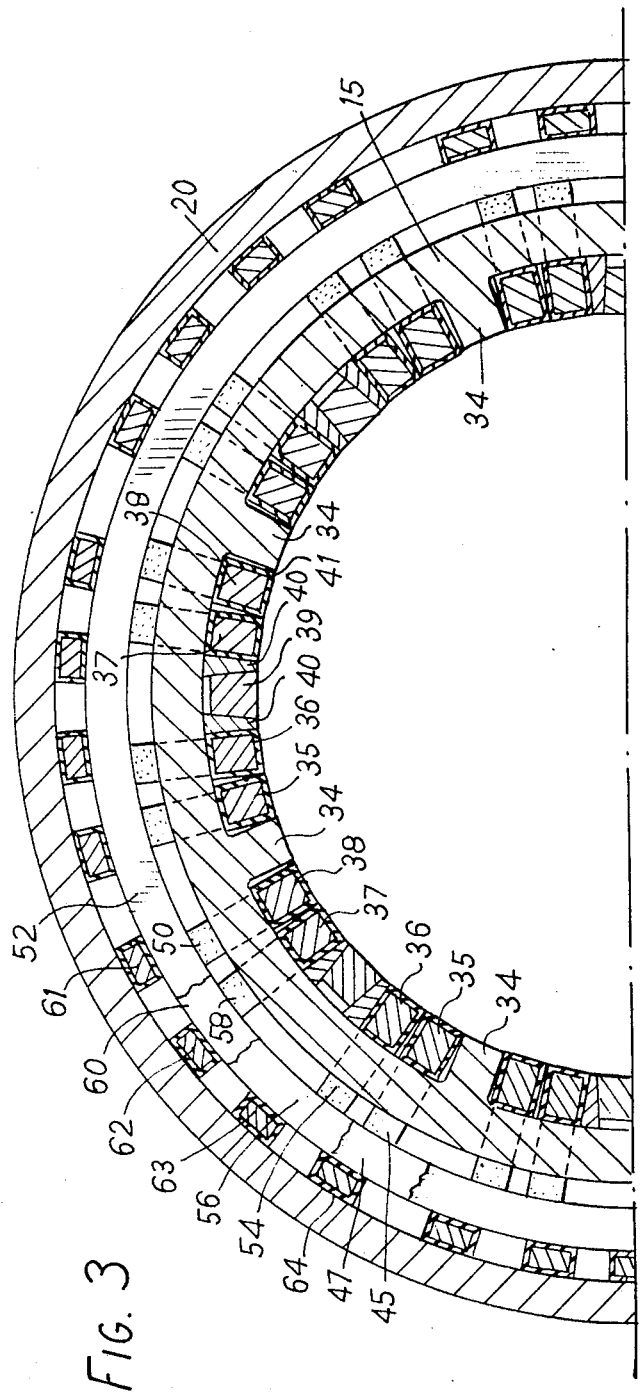

FIG. 3 is a transverse section of the machine of FIG. 1 on the line III-III of FIG. 1, FIG. 4 is a developed view of part of the inside surface of the inner rotor of the machine of FIG. 1, with the planes of section of FIGS. 1 and 3 shown at I—I and III—III, respectively, and FIG. 5 is a developed view of the outer rotor as seen on the line IV—IV of FIG. 1, with the plane of section of FIG. 3 shown at III—III.

The machine shown in the drawings is designed primarily as a motor and will be described as such but it will be appreciated that it would also be operated as a generator.

The machine has two end frame members 10 and 11 between which is supported an annular cryostat 12 in which superconducting field coils 13 and 14 are enclosed to maintain them at superconducting temperatures. An inner rotor 15 of cylindrical drum form is mounted at one end in bearings 16 in the frame member 10. The other end of the inner rotor 15 is secured to an inner shaft 17 which runs within an outer sleeve shaft 18. The shaft 18 is mounted in bearings 19 in the frame member 11 and is secured to an outer rotor 20 which is also of cylindrical drum form and coaxially surrounds the inner rotor 15. Bearings 21 are provided between the outer rotor 20 and the inner rotor 15 at one end and bearings 22 between the outer rotor 20 and the shaft 17 at the other end. The rotors 15 and 20 are thus free to rotate relative to one another and in operation of the machine, as will be described below, they rotate in different directions.

Figure 2:
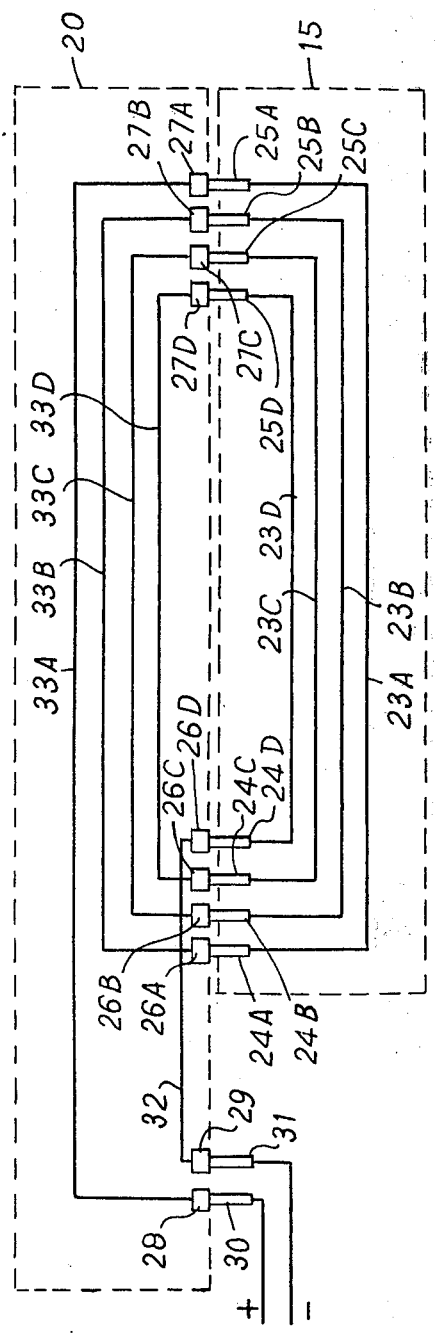
FIG. 2 is a diagram of the electricl connections in a machine of FIG. 1.

Referring now to FIG. 2, this illustrates the way in which conducting paths on the two rotors are electrically connected. The inner rotor 15, represented by a broken outline, has four conducting paths 23A, 23B, 23C and 23D, each of which is connected at its ends to a pair of brushes 24A and 25A, 24B and 25B, and so on. The brushes 24A to 24D engage corresponding slip rings 26A to 26D fixed to the outer rotor 20, which again is represented by a broken outline, and the burshes 25A to 25D engage corresponding slip rings 27A to 27D fixed to the outer rotor. The outer rotor 20 additionally has slip-rings 28 and 29 which are engaged by fixed brushes 30 and 31, respectively, through which current is supplied to the machine from a direct current source. The slip-ring 31 is connected to the slip-ring 26D by a conductor 32.

The outer rotor has four conducting paths 33A to 33D. The conducting path 33A is connected at one end to the slip-ring 28 and at the other end to the slip-ring 27A and thus by way of brush 25A is connected to the corresponding end of the conducting path 23A. The remaining interconnections are such as to establish a series connection of conducting paths in which the paths of the two rotors alternate thus: 33A, 23A, 33B, 23B, 33C, 23C, 33D, 23D, the path 23D of the inner rotor being then connected by way of brush 24D, slip-ring 26D, conductor 32, slip-ring 29 and brush 31 to the other terminal of the machine.

It will be noted that the direction of flow of the current in all the conducting paths 23A to 23D of the inner rotor 15 is the same and is opposite to the direction in the paths 33A to 33D of the outer rotor 20. Hence, since all these conducting paths lie in the same magnetic field produced by the coils 13 and 14 (FIG. 1), the opposite directions of current flow result in opposite directions of rotation for the inner and outer rotors and the shafts 17 and 18 are driven in counter-rotation. For marine use it is convenient to couple contra-rotating propellers to the shafts 17 and 18. However, if only a single direction of drive is required the two shafts can be coupled together by appropriate gearing.

Whereas in the simplified electrical diagram of FIG. 2 four conducting paths are shown on each rotor, the number of conducting paths may be smaller or greater than four and each of the conducting paths may consist of several conductors connected in parallel between the corresponding slip-rings on the outer rotor or between corresponding brush groups on the inner rotor. It is also, of course, possible to have slip-rings on the inner rotor and brushes on the outer rotor or an arrangement in which the conductors on each rotor are connected to slip-rings at one end and brushes at the other.

In the specific construction shown in the drawings each of the four conducting paths on the inner rotor is composed of eight parallel-connected conductors bars and similarly each of the four conducting paths on the outer rotor is composed of eight conductor bars. Four slip-rings and four brush sets at one end of the rotors and a further four slip-rings and brush sets at the other end serve to provide the interconnections between the conducting paths of the two rotors.

Referring now to FIG. 3, the inner rotor 15 has on its inner surface torque fingers 34 in the form of axially-extending ribs which project radially inwards from the rotor 15. Between each pair of torque fingers 34 there is formed a recess in which four conductor bars 35, 36, 37 and 38 are retained by a wedge 39 and co-operating shins 40. The four conductor bars are each covered with an individual layer 41 of insulating material and are thus insulated from one another. Each of the bars 35 to 38 forms part of a different conducting path. Thus, as shown in FIG. 4, the conductor bar 35 is the longest of the four bars and has two cranked ends 42 and 43 to which are attached brushes 44 and 45, respectively. These brushes 44 and 45 extend through openings 46 in the rotor 15 (FIG. 1) to contact slip-rings 48 and 47, respectively, mounted at opposite ends of the outer rotor 20. In a similar way the conductor bars 38, 36 and 37, which are each shorter than the preceding bar, have brushes 49 and 50 on bar 38 which contact slip-rings 51 and 52, respectively, brushes 53 and 54 on bar 36 which contact slip-rings 55 and 56, respectively, and brushes 57 and 58 on bar 37 which contact slip-rings 59 and 60, respectively. In the left-hand part of FIG. 3 the slip-rings have been cut away so that all four rings can be seen together with the brushes which contact them. For clarity of illustration the brushes are shown in FIG. 3 as extending radially outwards from their respective inner rotor conductor bars, ignoring the offset created by the cranked ends of the conductor bars.

There are eight sets of conductor bars 35 to 38 on the inner rotor 15 and the corresponding bars of each set are constructed and arranged in an exactly similar manner so that, for example, all the bars 35 have brushes which engage the single pair of slip-rings 47 and 48 and the bars 35 are thus connected in parallel to form one conducting path corresponding to the path 23A of FIG. 2. Similarly, the bars 36 are parallel-connected and form a single conducting path corresponding to the path 23C of FIG. 2 while the bars 37 form the path 23D and the bars 38 the path 23B.

On the outer rotor 20 there are eight sets, each consisting of four conductor bars, of which one set is seen in FIG. 5 and consists of bars 61, 62, 63 and 64. The bars 61 of the eight sets are connected in parallel to form the conducting path 33A of FIG. 2, while the bars 62, 63 and 64, respectively, similarly form the conducting paths 33B, 33C and 33D. Thus, each bar 61 is connected at one end to a slip-ring 28 (FIG. 2) and at the other end is welded to the slip-ring 47 (FIG. 5). Each bar 62 is connected between rings 48 and 52, each bar 63 between rings 51 and 56 and each bar 64 between rings 55 and 60. Finally, slip-ring 59 is connected by conductor 32 to slip ring 29 (FIG. 2). There may be a multiplicity of such conductors 32 in parallel if required to carry the total current.

The conductor bars 61 to 64 and the conductor bar 32 are mounted on the inner surface of the outer rotor 20 and the slip-rings 47, 48, 51, 52, 55, 56, 59 and 60 are mounted within the cylindrical array of bars 61 to 64 and are embedded in a layer 65 of insulating material.

It will be seen that the conductor bars 35 on the inner rotor form a squirrel cage array which is interlaced with the squirrel cages formed by the bars 36, 37 and 38. Similarly, the bars 61 to 64 on the outer rotor form four interlaced squirrel cages.

Whereas in the contruction shown, the field coils 13 and 14 are annular coils surrounding the two rotors, it is possible also to have annular field coils 13' and 14' within the two rotors. The coils 13' and 14' may be additional to or in place of the coils 13 and 14.

In the machine described the multiple slip-rings are continuous, but the invention may also be applied in machines having a single, segmented, slip-ring at each end of the rotor system, of the type described in our U.S. Pat. No. 3,497,739.

I claim:

1. A homopolar dynamo-electric machine comprising a stationary field winding, first and second rotors mounted for rotation about a common axis in opposite directions relative to said field winding, each of said rotors comprising a plurality of conducting paths arranged to cut the field of the said winding upon rotation of the rotor, and current transfer means arranged to connect one end of the conducting path of the first rotor to the corresponding end of the the conducting path of the second rotor for the flow of current through the conducting paths of said first and second rotors between the ends thereof in opposite directions, said current transfer means comprising a plurality of current transfer devices each connecting one end of a conducting path on one rotor to the corresponding end of a conducting path on the other rotor whereby a series circuit is formed consisting of conducting paths of the first and second rotors in alternation.

2. A homopolar machine as claimed in claim 1 in which the first rotor is disposed within the second rotor and the two ends of each of said conducting paths are located in axially-spaced planes which extend transversely to said axis.

3. A homopolar machine as claimed in claim 2 in which each of said first and second rotors is a cylindrical drum.

4. A homopolar machine as claimed in claim 3 in which the conducting paths of said rotors are in the form of bars extending parallel to said axis.

5. A homopolar machine as claimed in claim 1 in which each of said conducting paths comprises a plurality of conductors distributed around the rotor, said conductors being parallel-connected.

6. A homopolar machine as claimed in claim 2 wherein said field winding comprises at least one annular field coil disposed within said first rotor.

7. A homopolar machine as claimed in claim 1 in which said second rotor has a pair of slip-rings cooperating with stationary brushes which act as terminals of a circuit formed by said conducting paths.

8. A homopolar dynamo-electric machine comprising a stationary field winding, first and second rotors mounted for rotation about a common axis in opposite directions relative to said field winding, each of said rotors comprising at least one conducting path arranged to cut the field of the said winding upon rotation of the rotor, and current transfer means arranged to connect one end of the conducting path of the first rotor to the corresponding end of the conducting path of the second rotor for the flow of current through the conducting paths of said first and second rotors between the ends thereof in opposite directions, said current transfer means comprising a brush on said first rotor and a slip-ring on said second rotor.

* * * * *